March 23, 1971     E. C. HUEBSCHMAN     3,572,113
HYDRAULIC MODEL TESTING TANK WITH ELECTRICAL TRACING INDICATOR
Filed April 1, 1969     2 Sheets-Sheet 2

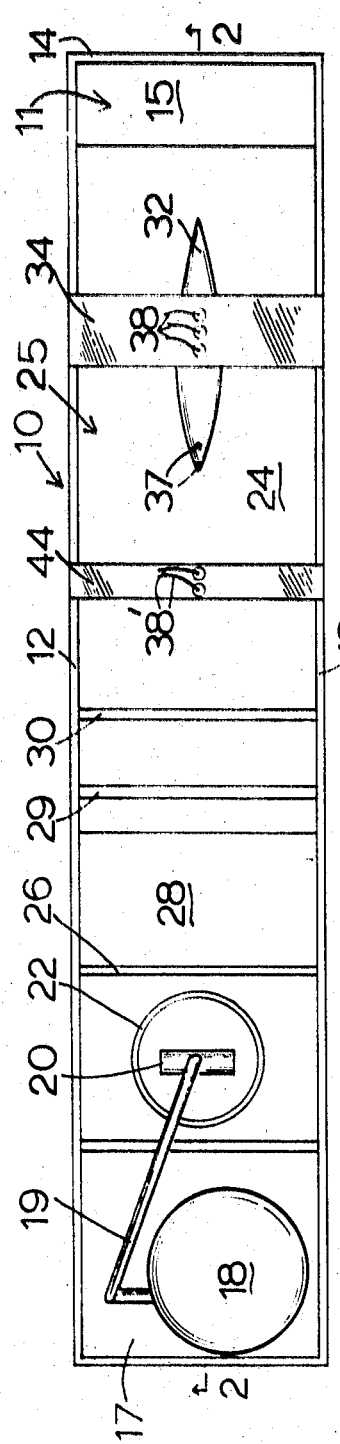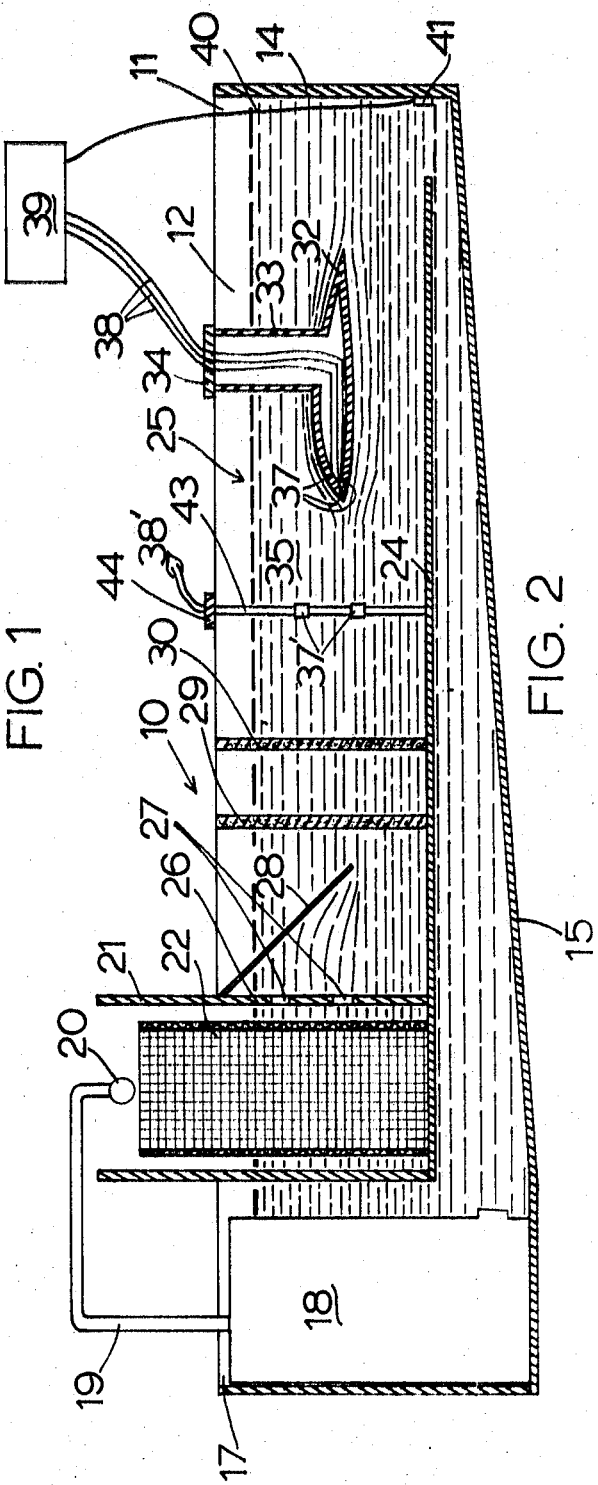

INVENTOR
EUGENE C. HUEBSCHMAN
BY
*Harrington A. Lackey*
ATTORNEY

United States Patent Office 3,572,113
Patented Mar. 23, 1971

3,572,113
HYDRAULIC MODEL TESTING TANK WITH ELECTRICAL TRACING INDICATOR
Eugene Carl Huebschman, 1100 Bragg Circle, Tullahoma, Tenn. 37388
Filed Apr. 1, 1969, Ser. No. 811,898
Int. Cl. G01m 10/00
U.S. Cl. 73—148          9 Claims

ABSTRACT OF THE DISCLOSURE

An apparatus for rendering visable the flow lines past a model placed in testing tank or model basin. An indicator such as phenolphthalein is placed in an electrolytic solution. Electrodes located on the model are energized so that a local change in pH results producing streaks of indicator solution for studying the flow lines about the model.

BACKGROUND OF THE INVENTION

This invention relates to an electrical tracing apparatus, and more particularly to an electrical apparatus for tracing visible flow lines of a solution moving relative to an electrode. Heretofore, in the art of recording characteristics of the flow of liquid past a model, dye has been introduced into the solution upstream of the model. Such practice has been ineffective since the dye diffuses into the fluid stream before it has an opportunity to contact and form its characteristic flow lines about the exterior surface of the model. Accordingly, the results from such tests have proved to be inadequate or inconclusive.

SUMMARY OF THE INVENTION

The electrical tracing apparatus made in accordance with this invention includes an electrolytic solution having a chemical indicator and an electrically conductive probe in contact with the solution, so that when the probe and the solution are moved relative to each other, and the electrical probe is energized, colored flow lines of rather sharp distinction are formed where the energized probe contacts the flowing solution.

Such an apparatus is very effective in the recording of flow characteristics of models, such as air foils, boat hulls, submarines, torpedoes, and other bodies adapted to move through fluid mediums.

It is a distinct advantage of this apparatus that the electrode can be placed precisely in the exterior surface of a model where the flow measurement is desired, and will faithfully reproduce the flow characteristics of the relative movement of the model surface in its fluid environment.

BRIEF DESCRIPTION OF THE DRAWINGS

FIG. 1 is a top plan view of one form of apparatus made in accordance with this invention, without the electrolytic solution;

FIG. 2 is a section taken along the line 2—2 of FIG. 1, further disclosing the electrolytic solution;

DESCRIPTION OF THE PREFERRED EMBODIMENTS

Figure 3:
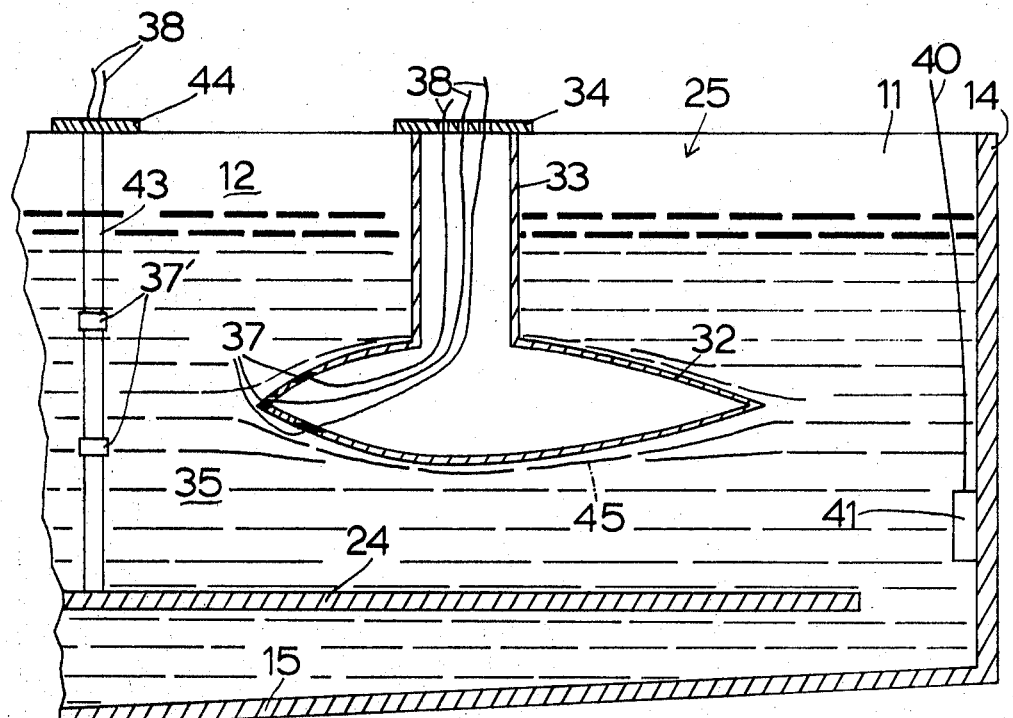
FIG. 3 is an enlarged sectional elevation of the air foil of FIG. 2, illustrating the flow lines.

One form of the apparatus 10 for carrying out this invention is disclosed in FIGS. 1–3. The apparatus 10 includes a large tank 11, which is preferably made of transparent material, such as transparent plastic, to permit the flow lines developed by the apparatus 10 to be observed from outside the tank 11. The tank 11 includes a pair of side walls 12 and 13, an end wall 14 and a bottom wall 15. The opposite end of the tank 11 comprises a pump housing 17 supporting a liquid pump 18. The pump 18 is connected by an outlet hose 19, to a discharge pipe 20 supported within the upper portion of a filter chamber 21 supported within the tank 11 adjacent the pump housing 17.

The filter chamber 21 includes a random filter 22 consisting of a cylindrical sheet of porous, or open-mesh, material having an open top, and supported on the floor or bottom wall 24 of the fluid channel 25 defined by the tank side walls 12 and 13. The random filter 22 is located beneath the discharge pipe 20 so that any liquid discharge from the pipe 20 is introduced into the interior of random filter 22. The purpose of the random filter 22 is to confine the liquid so that any entrained air bubbles will rise to the top before the liquid discharges through the apertures of the filter wall 22 at a uniform pressure. Separating the filter chamber 21 from the rest of the channel 25 is a barrier 26 having apertures 27 therethrough to further assist in maintaining the uniform pressure of the fluid passing through the apertures 27.

Mounted upon the barrier 26 and disposed at a declining angle downstream from the apertures 27 is a baffle 28. The baffle 28 is designed to promote laminar flow in the solution 35 flowing through the channel 25. The angle of the baffle is critical, and depends upon the velocity and density of the solution 35.

A pair of screen filters 29 and 30 are also mounted downstream from the baffle 28 in order to further produce laminar flow in the solution. The filters 29 and 30 may be grids of screen wire or grids of open-mesh plastic.

Between the baffle 28 and the first screen filter 29, another filter, not shown, consisting of a plain sheet of paper soaked in paraform may also be introduced to assist in obtaining laminar flow of the solution in the channel 25.

A model, such as air foil 32, for which the flow characteristics are desired to be known, may be formed as shown in FIGS. 2 and 3, having a hollow body with streamlined surfaces supported by a hollow stem 33 from a bracket 34 fixed transversely across the top of the channel 25. The stem 33 depends into the channel 25 sufficiently that the entire air foil 32 will be completely immersed in the solution 35.

Formed in the skin, or the exterior streamlined surface, of the air foil 32 is one or more electrodes, or electrically conductive probes 37. These probes 37 are mounted in the exterior surface of the air foil 32 in such a manner that they are in electrical contact with the solution 35. Yet, the probes 37 do not extend externally beyond the surface of the air foil 32 to form projections which might create turbulent flow. Each conductive probe 37 is connected by an electrical lead 38 to an electrical power and control unit, such as 39, which in turn is connected by a ground lead to a positive electrode 41 secured in any convenient position within the tank 11, so long as it is in electrical contact with the solution 35. In this manner, when electrical current is supplied through the control unit 39 to the electrodes 37, then an electrical circuit will be completed through the electrolytic solution 35, electrode 41 and return lead 40. The probes 37 are negative electrodes, while the electrode 41 is positive.

The support member, such as rod or rods 43, is an optional mounting for electrodes 37' connected by leads 38' to the control unit 39. The rod 43 may be mounted upstream from the model 32, if it is desired to create flow lines in the solution 35 in advance of the model 32. The rod 43 may be suported from the top of the channel 25 by means of the transverse bracket 44.

The solution 35, as previously discussed, must be an electrolytic solution in order to complete the electrical circuit between the probes 37 and the positive electrode 41, including a chemical color indicator. The solution 35 may be a high conductivity solution or a low conductivity solution.

Basically, the high conductivity solution 35 comprises an aqeuous solution of potassium chloride mixed with a saturated solution of phenolphthalein dissolved in a liquid or liquid base such as water, an alcohol, or a carbohydrate. The preferred liquid base is ethyl alcohol or isopropyl alcohol. Where a simple or a polyhydroxy alcohol is employed as the liquid base for dissolving the phenolphthalein, vapors may be generated, which are not only hazardous, but produce a change in the viscosity of the solution 35 because of the loss of the vapor.

The aqueous solution of potassium chloride is preferably concentrated to include four parts of water and one part of potassium chloride, by weight. In the preferred method of preparing, the aqueous solution of potassium chloride, the solution is boiled and allowed to stand for approximately two days, before being mixed with the phenolphthalein solution. The ethyl alcohol or isopropyl alcohol is employed as the liquid base to dissolve the phenolphthalein in order to give tne color of the flow lines 45 (FIG. 3) a greater persistance than other types of liquid base. The phenolphthalein must be added very slowly to the alcohol to prevent precipitation.

It has also been discovered that the flow lines 45 have a more vivid color and the electrolytic solution 35 has a longer life if glycerol is added to the solution 35 in the amount of one-third of the total volume of solution 35. The addition of the glycerol also permits the viscosity of the solution 35 to be varied by heating the solution 35. The viscosity is changed to simulate different Reynolds numbers for various tests upon the model 32.

The phenolphthalein may also be dissolved in a water base, or in any liquid carbohydrate, or in a solution of solid carbohydrate, such as sugar, in alcohol or water. The different bases provide different viscosities.

A low conductivity electrolytic solution 35 may be formed by hydrolyzing hexoses and sucrose with acid and then adding potassium chloride, and boiling the entire mixture. After the mixture has stood for several days, then the phenolphthalein solution, previously described, may be slowly added to avoid precipitation.

The effect of employing low conductivity solution 35 is that the coloration of the flow lines 45 will appear further downstream from the probes than when a high conductivity solution is employed.

In operating the apparatus 10, the designed model, such as air foil 32, is mounted by the bracket 34 so that the air foil 32 is completely immersed in the electrolytic solution 35 at the downstream end of the channel 25. The pump 18 is started to pump the solution 35 through the discharge conduit 19 and discharge pipe 20 into the interior of the cylindrical random filter 22. The entrained air bubbles within the random filter 22 rise to the surface, thereby creating a uniform pressure upon the solution 35 discharged through the openings in the filter 22. The solution 35 then passes through the apertures 27 in the barrier 26, which further produce uniform fluid pressure. The solution 35 is then confined to move beneath the baffle 28 at an increased velocity, yet still permitting laminar flow. The laminar flow of the solution 35 is further improved by its passage through the screen filters 29 and 30.

Assuming the electrodes 37 are employed in the surface of the air foil 32, electricity is supplied to these probes 37 causing an electrical current to be completed through the electrolytic solution 35 and creating the colored flow lines 45, disclosed in FIG. 3. These flow lines 45 are created at the precise points on the body of the model 32, where analysis of the flow is desired, and the flow lines 45 are clearly visible through the transparent walls 12 and 13 of the tank 11. These flow lines 45 may be photographed, if desired, and the velocity of the flow lines 45 determined by the frame speed of the camera.

As the solution 35 moves downstream over the rear edge of the bottom wall 24, it falls upon the bottom wall 15 of the tank 11 which slopes downward toward the pump housing 17, so that the solution will flow by gravity to the pump housing where the solution 35 is recirculated by the pump 18 to repeat the cycle.

As the solution 38 returns to the pump housing 17, the colored flow lines 45 are self-liquidating, so that they remain colorless until again re-colored by contact with the electrodes 37. Thus, the process can be repeated automatically without changing the solution or introducing dyes into the solution or removing and replacing exhausted colored solutions.

Figure 4:
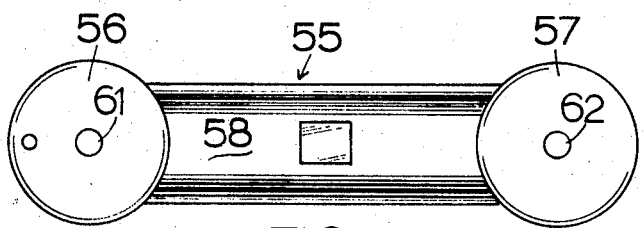
FIG. 4 is a top plan view of a modified form of apparatus.
Figure 5:
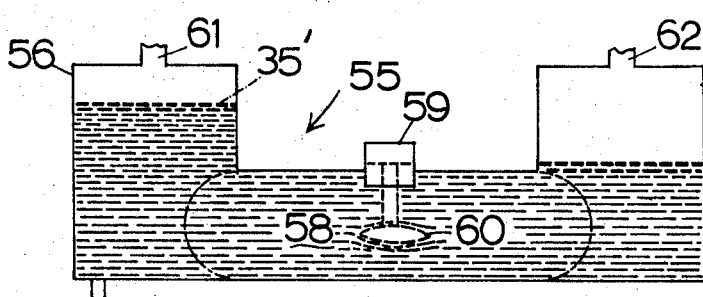
FIG. 5 is a side sectional elevation of the apparatus disclosed in FIG. 4.
Figure 6:
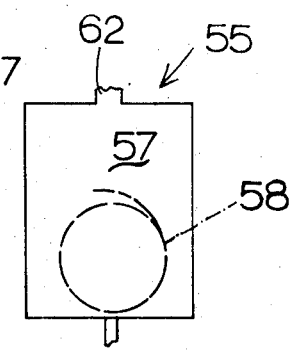
FIG. 6 is a right end elevation of the apparatus disclosed in FIG. 4.

FIGS. 4, 5 and 6 disclose a modified apparatus 55 for carrying out the same process. The apparatus 55 includes an inlet pressure chamber 56, an outlet pressure chamber 57 and a tunnel 58 connecting the pressure chambers 56 and 57 into continuous liquid communication. Mounted within the tunnel 58 by bracket 59 is an air foil 60 which may be identical to the air foil 32 in FIGS. 1–3. Electrodes such as 37 are mounted in the air foil 60 and controlled in the same manner.

Electrolytic solution 35' fills the tunnel 58 and partially fills the pressure chambers 56 and 57. By supplying compressed air through the inlet 61, the electrolytic solution 35' is forced down and through the tunnel 58 to raise the level in the outlet chamber 57 to expel air through the outlet pipe 62. By introducing compressed air through the outlet 62, the solution is returned to the inlet pressure chamber 56. In this manner, the flow of soltion 35' is effected with a great degree of controlled uniform pressure and laminar flow about the air foil 60.

It is also within the scope of the invention to maintain the electrolytic solution 35 in a static condition within a receptacle, and mount the model 32 so that it can be moved through the solution. One method of moving the model 32 is to move or slide the bracket 34 along the top of the tank 11. Thus the same colored flow lines 45 can be produced by the electrically charged probes 37 because of the relative movement between the air foils 32 and the solution 35.

It is also within the scope of this invention to soak a sheet of paper with the electrolytic solution 35 and incorporate the electrically conductive probe 37 in the form of a stylus, typewriter key or computer key in order to make a distinctive colored impression upon the chemically soaked paper.

The combination of the probe 37 and electrolytic solution 35 may have numerous other uses when they are moved relative to each other in contact with each other, such as in colored signs, warning signals, toys or educational devices. The combination of the electrode 37 and the solution 35 may also be employed to function as an integrator, since the color produced by the probe 37 is proportionate to the current.

What is claimed is:
1. An electrical tracing apparatus comprising:
   (a) an electrolytic solution including a chemical indicator,
   (b) a channel holding said solution,
   (c) an electrically conductive probe,
   (d) means supporting said probe in said channel and immersed in said solution,
   (e) means for moving said solution relative to, and in electrical contact with, said probe under conditions to produce laminar flow, and
   (f) means for supplying electricity through said probe and said solution while in contact with each other to produce visible flow lines in said solution.

2. The invention according to claim 1 in which said channel comprises a Bernoulli tunnel.

3. The invention according to claim 1 further comprising a model having an exterior surface for which the flow characteristics are to be determined, said probe being mounted in said exterior surface so that said probe is in contact with said flowing solution, yet does not protrude beyond said exterior surface.

4. The invention according to claim 1 in which said supporting means is movable relative to said channel.

5. The invention according to claim 1 in which said chemical indicator comprises phenolphthalein.

6. The invention according to claim 1 in which said electrolytic solution comprises an aqueous solution of potassium chloride.

7. The invention according to claim 1 in which said electrolytic solution comprises an aqueous solution of potassium chloride, and said chemical indicator comprises a saturated solution of phenolphthalein in a liquid base from the group consisting of water, an alcohol or a carbohydrate.

8. The invention according to claim 7 in which said liquid base consists of ethyl alcohol or isopropyl alcohol.

9. The invention according to claim 7 in which said aqueous solution of potassium chloride comprises one part potassium chloride and four parts water, by weight.

References Cited

UNITED STATES PATENTS

| | | | |
|---|---|---|---|
| 2,616,291 | 11/1952 | Benedum | 73—147 |
| 3,017,769 | 1/1962 | Orlin | 73—147 |
| 2,621,671 | 12/1952 | Eckfeldt | 204—1X |

S. CLEMENT SWISHER, Primary Examiner